United States Patent
Dickins et al.

(10) Patent No.: US 11,100,942 B2
(45) Date of Patent: Aug. 24, 2021

(54) MITIGATION OF INACCURATE ECHO PREDICTION

(71) Applicant: DOLBY LABORATORIES LICENSING CORPORATION, San Francisco, CA (US)

(72) Inventors: Glenn N. Dickins, Como (AU); Tet Fei Yap, Lane Cove North (AU); Guodong Li, St. Ives (AU); Paul Holmberg, Marsfield (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/631,159

(22) PCT Filed: Jul. 13, 2018

(86) PCT No.: PCT/US2018/042163
§ 371 (c)(1),
(2) Date: Jan. 14, 2020

(87) PCT Pub. No.: WO2019/014637
PCT Pub. Date: Jan. 17, 2019

(65) Prior Publication Data
US 2020/0227063 A1    Jul. 16, 2020

Related U.S. Application Data

(60) Provisional application No. 62/532,863, filed on Jul. 14, 2017.

(30) Foreign Application Priority Data

Oct. 10, 2017   (EP) ..................................... 17195667

(51) Int. Cl.
*G10L 21/0232*    (2013.01)
*G10L 21/0264*    (2013.01)
(Continued)

(52) U.S. Cl.
CPC ...... *G10L 21/0232* (2013.01); *G10L 21/0264* (2013.01); *G10L 25/21* (2013.01);
(Continued)

(58) Field of Classification Search
CPC ........ H04S 3/008; H04S 7/30; H04S 2400/01; H04S 2400/15; H04R 5/02; H04R 3/002;
(Continued)

(56) References Cited

U.S. PATENT DOCUMENTS 6,622,030 B1    9/2003   Romesburg
8,150,309 B2    4/2012   Braithwaite
(Continued)

OTHER PUBLICATIONS

"Multichannel Acoustic Echo Cancellation" www.buchner-net.com/mcaec.html, latest update Jun. 2011.
(Continued)

*Primary Examiner* — Disler Paul

(57) ABSTRACT

Systems and methods are described for compensating for inaccurate echo prediction in audio systems. A signal may be received at a microphone of an audio system, the signal including audio rendered using a spatial audio renderer across a multi-channel audio output. A signal may be received from the spatial audio renderer that indicates a change in rendering of audio. The audio system may then determine if there is echo power within the received signal greater than an expected echo power. After the signal from the spatial audio renderer has been received, the echo suppression applied to the received signal may be modified in response to a determination that the echo power is greater than the expected echo power, the echo suppression attenuating pre-selected frequency bands of the received signal.

16 Claims, 7 Drawing Sheets

(51) Int. Cl.
*G10L 25/21* (2013.01)
*H04R 5/02* (2006.01)
*H04S 3/00* (2006.01)
*H04S 7/00* (2006.01)
*G10L 21/0208* (2013.01)
*H04M 9/08* (2006.01)

(52) U.S. Cl.
CPC ............... *H04R 5/02* (2013.01); *H04S 3/008* (2013.01); *H04S 7/30* (2013.01); *G10L 2021/02082* (2013.01); *H04M 9/082* (2013.01); *H04S 2400/01* (2013.01); *H04S 2400/15* (2013.01)

(58) Field of Classification Search
CPC ............ H04M 9/082; G10L 21/0232; G10L 21/0264; G10L 25/21; G10L 2021/02082; G10L 21/02
USPC ................................ 381/66, 83, 93, 303, 96
See application file for complete search history.

(56) References Cited

U.S. PATENT DOCUMENTS

| | | | |
|---|---|---|---|
| 8,213,598 B2 | 7/2012 | Bendersky | |
| 9,173,025 B2 | 10/2015 | Dickins | |
| 9,361,874 B2 | 6/2016 | Mani | |
| 9,461,702 B2 | 10/2016 | Mani | |
| 9,544,422 B2 | 1/2017 | Mani | |
| 9,548,063 B2 | 1/2017 | Shi | |
| 9,552,827 B2 | 1/2017 | Johnston | |
| 9,659,576 B1 | 5/2017 | Kotvis | |
| 9,706,057 B2 | 7/2017 | Mani | |
| 9,866,792 B2* | 1/2018 | Ushakov | G10L 21/0208 |
| 9,947,336 B2 | 4/2018 | Shi | |
| 2012/0237047 A1 | 9/2012 | Neal | |
| 2014/0169568 A1 | 6/2014 | Li | |
| 2014/0307882 A1* | 10/2014 | LeBlanc | H04S 7/305 381/66 |
| 2014/0363008 A1* | 12/2014 | Chen | H04M 9/082 381/66 |
| 2016/0019909 A1 | 1/2016 | Shi | |
| 2018/0367674 A1* | 12/2018 | Schalk-Schupp | G10L 21/0264 |

OTHER PUBLICATIONS

Duttweiler, Donald L. "Proportionate Normalized Least-Mean-Squares Adaptation in Echo Cancelers" IEEE Transactions on Speech and Audio Processing, vol. 8, No. 5, Sep. 2000, pp. 508-518.

Gupta, D.K. et al "Review Paper on Linear and Nonlinear Acoustic Echo Cancellation" Proc. of the 3rd International Conference on Frontiers of Intelligent Computing: Theory and Applications, pp. 465-473, 2014.

Park, Yun-Sik, et al "Integrated Acoustic Echo and Background Noise Suppression Technique Based on Soft Decision" EURASIP Journal on Advances in Signal Processing, 2012, pp. 1-9.

Schwarz, A. et al "Combined Nonlinear Echo Cancellation and Residual Echo Suppression" 11th ITG conference on Speech Communication, Erlangen, Germany, Sep. 24-26, 2014, pp. 1-4.

Valero, M. et al "Coherence-aware Stereophonic Residual echo Estimation" IEEE Hands-free Speech Communications and Microphone, Mar. 1-3, 2017.

* cited by examiner

MITIGATION OF INACCURATE ECHO PREDICTION

CROSS REFERENCE TO RELATED APPLICATIONS

This application claims priority to U.S. Provisional Patent Application No. 62/532,863, filed on 14 Jul. 2017, and European Patent Application No. 17195667.5 filed on 10 Oct. 2017, the disclosures all of which are incorporated herein by reference in their entirety.

TECHNICAL FIELD

Embodiments herein relate generally to audio signal processing, and more specifically to compensating for inaccurate echo prediction.

SUMMARY OF THE INVENTION

Systems and methods are described for compensating for inaccurate echo prediction in audio systems. A signal may be received at a microphone of an audio system, the signal including audio rendered using a spatial audio renderer across a multi-channel audio output. A signal may be received from the spatial audio renderer that indicates a change in rendering of audio. The echo suppression applied to the received signal may be modified in response to receiving the signal from the spatial audio renderer, the echo suppression attenuating pre-selected frequency bands of the received signal.

The echo suppression may be modified in a variety of ways. For example, the echo suppression modification may include at least one of forcing adaptation of an echo suppression module (that applies the echo suppression to the received signal) and increasing an adaptation rate of the echo suppression module in response to receiving the signal from the spatial audio renderer. In other embodiments, the echo suppression may be based on a predicted echo power value derived from the residual signal. This predicted echo power value may be scaled to increase the predicted echo power value, making the echo suppression more sensitive to detected echo power. In other embodiments, worst-case filter coefficients may be used to determine the predicted echo power value in response to detecting echo power or receiving identification of a condition, similarly making the echo suppression more sensitive to detected echo power in the residual signal.

In further embodiments, other conditions may signal to the audio system that the modified echo suppression may be beneficial. Such conditions may include system events of the audio system and/or determining that a non-full rank covariance matrix is being used in echo cancellation. Such conditions may indicate a risk of leakage of the echo canceller of the audio system, making the modification of echo suppression advantageous.

BRIEF DESCRIPTION OF THE FIGURES

This disclosure is illustrated by way of example and not limitation in the figures of the accompanying drawings, in which like references indicate similar elements, and in which.

DETAILED DESCRIPTION

Figure 1:
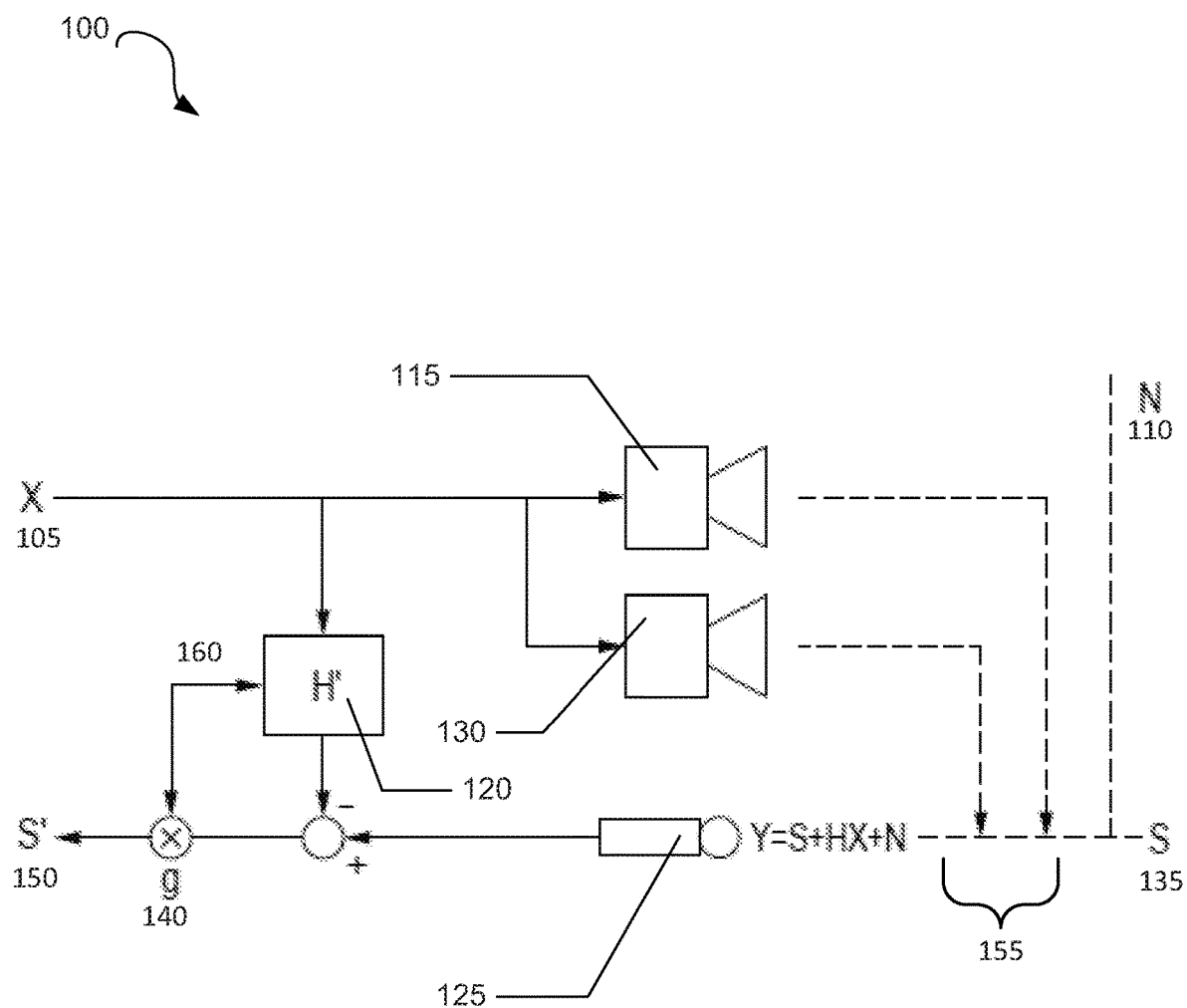
FIG. 1 shows a block diagram of a system providing echo cancellation for an audio system, according to an embodiment.

Echo detection, particularly in the context of echo cancellation systems, have been heavily scrutinized in academic literature. However, real-world systems have to deal with issues of multi-channel output, unexpected system changes, highly correlated audio outputs, nonlinearities and the potential of uncertain signal processing occurring in the echo path being estimated, which are generally not addressed in the conventional literature. Generally, while 20-30 dB of echo suppression may be expected from a conventional echo cancellation system, the practical echo performance may still be dominated by points of instability, where the echo canceller can be disturbed or diverge due to inaccurate echo prediction. Even a momentary instability of the echo canceller can cause a significant echo leak with high impact, particularly in real-time communication systems. Efforts to improve the convergence and adaptation rate of echo cancellers are widely published, however very few of these are able to offer complete elimination of leaks. Furthermore, reducing the convergence time involves increasing the adaptation rate and this can increase the instability, making the leaks shorter in duration but more significant in energy. Additional suppression is sometimes linked to the echo cancellation stage to clean up residual echo. However, in conventional designs this can suffer the same failure modes at points of instability, and echo leak can be incorrectly identified as desired input signal and still pass through.

The proposed solution described herein builds on an alternate framework that uses an adaptive echo suppressor working independent of any echo cancellation system. The present invention may utilize a system of dual cancellation and suppression, or just adaptive suppression as an alternative or companion to conventional echo cancellation. Working in this framework, rather than increasing the sophistication of the echo canceller to deal with unexpected leaks, it is possible to modify or control the behavior of the suppressor in order to cover up any leaks. The systems and methods described below may intervene in situations where conventional echo cancellation may leak by temporarily forcing a higher level of suppression and/or adaptation of the echo suppressor to catch the leak. This approach may generally provide a more robust echo detector that performs well in the nominal operating case, and an effective echo suppressor that can remove the general residual and be controlled to step in more aggressively when needed.

The below discussion generally assumes the case of a multi-channel echo canceller where there are several output speakers of an audio system. Whilst there are some aspects of this that may apply to a single output channel echo control system, as will be shown below such systems do not suffer the same issues with instability and potential ambiguity in the adaptation for removing echo. While the embodiments and discussions are presented for multiple output channels and a single microphone, it is noted that the present invention is also considered for the case of multiple microphones, where each microphone requires a parallel set of adaptive filters for estimating the path from all speakers of the audio system to the microphones.

The complexity of echo cancellation rests largely around estimating, online, the characteristic path in the electroacoustic system from where a reference signal is passed for output to speakers, to where a signal is received incoming from a microphone. In discussing the electro-acoustic system herein, the speakers are referred to as the 'outputs' and the microphone(s) are referred to as the 'inputs'. Each of the speakers signals intended for playback may be modified by electrical and acoustical filtering, with the potential for time variation and non-linear distortions, before being combined with the filtered versions of the signal from other speakers and the potential addition of noise at the microphone.

FIG. 1 shows a block diagram of a system providing echo cancellation for an audio system, according to an embodiment. System 100 shown in FIG. 1 includes multiple speakers 115 and 130 and a single microphone 125. In a first example, the system 100 may be embodied as a single audio device, e.g. a laptop, smartphone or tablet computer, including both the speakers 115, 130 and microphone 125. In a second example, the system 100 is embodied as multiple interconnected devices, e.g. a system comprising first a second devices, the first device comprising the speakers 115, 130 and the second device including the microphone 125, wherein the devices are connected to each other via a wireless connection or a cable. The echo cancellation system 100 attempts to simulate the complex set of filter paths from the speaker outputs to create a signal that is subtracted from the microphone input to ideally remove the acoustic echo present in the microphone signal. The acoustic echo may be estimated and subtracted by the echo cancellation system 100 from an incoming microphone signal.

Consider the multi-channel signal X 105 intended for output to speakers 115 and 130, and some desired signal S that would normally be present at the microphone. The system path from speaker feeds to the microphone 155 may be modeled as a set of linear filter responses H, one for each of the channels in X. The signal at the microphone 125 is then the combination of the desired signal S, the acoustic echo HX 155, and additional noise N 110:

$$Y = S + HX + N \quad (1)$$

Where in this example, Y, S and N are assumed to be single-channel signals, and X is a multi-channel signal. In the case of a single band and single tap filter, X may be represented by a column vector, with each row being an input channel sample, and H may be represented by a row vector where each column is a coefficient or filter gain for that channel Such frameworks are known and naturally extended to longer filters and time frames using combinations of filter banks, multiplication and convolution operations as is conventionally known.

Consider a system that then attempts to approximate or model the actual electroacoustic path H 155 with a linear (or more complex than linear) approximation H' 120. For a given model H', the signal S' 150 after the subtraction of the echo signal prediction is $$S' = S + HX + N - H'X = S + (H-H')X + N \quad (2)$$

Here linear filtering is assumed for which the expression H−H' is simple difference in the linear filters. In some embodiments, H' is extended to include non-linearities in the model; however this is not necessary for demonstrating the core issue of multi-channel degeneracy and instability due. Often, more complex approximations of H', in attempts to more accurately approximate the electroacoustic path H, can lead to greater likelihood of over-fitting models and increased instability at particular events common in practice. A key theme of this invention is to present a solution that is able to fix the problem of echo cancellation instability, rather than to continue to layer complexity in the echo cancellation to try and solve the problem.

As shown in equation (2), there is an expression (H−H')X that involves an inner product, or summation of the outputs of several filters (H−H') being applied to multiple input channels X, to create a single channel signal for subtraction on a particular microphone (or other linear combination of input microphones reduced to a single channel). As noted previously, the extension to multiple microphones does not change or resolve the stated problem here, as for each single channel output of the system, a single channel estimate of the echo path is used that includes a contribution from multiple channels of electroacoustic output into the system presenting echo.

The ideal solution, to which an adaptive or offline solution will attempt to converge is:

$$H - H' = 0 \text{ or } H' = H \text{ (expressed as minimizing } |H - H'|\text{)} \quad (3)$$

However, in practice the online adaptive system may achieve this by minimizing the residual obtained from subtracting estimated echo from the input signal, which for the linear case is equivalent to the subtraction of the approximation from the actual echo path applied to some source:

$$\text{Minimize} |(H-H')X| \quad (4)$$

Since equation (4) represents a linear combination of multiple filters on multiple input signals, and a single channel output, it is over-specified. If the covariance of X (R=E{XX*}) is in some way singular, not full rank or poorly conditioned (i.e., the input channels lack full linear independence, which may be highly likely in cases where the output signal is a spatially acoustic scene), there can be one or more degrees of freedom where (4) can be satisfied without satisfying (3).

In particular, consider an additional set of filters K, such that H″=H'+K:

$$(H-H'')X = (H-H'-K)X = (H-H')X - KX \quad (5)$$

Note that for any set of filters KX=0, the solution H″ is equivalent to H'. Therefore, a subspace of solutions exists where H' is not unique, meaning that any adaptive system may wander in a subspace of equally viable solutions. However, if X was to be an arbitrary and diverse set of signals, we see that:

$$KX = 0 \text{ if and only if } K = 0 \quad (6)$$

A suitably complex spatial signal that is diverse enough over time will keep the adaptive process from diverging, where multiple solutions for H' are present. A condition that X be suitably complex may be expressed mathematically by expanding the expression to be minimized as its square:

$$E\{|(H-H'-K)X|2\} = HRH^* - H'RH'^* - KRK^*R = E\{XX^*\} \quad (7)$$

Where R is the covariance of the multi-channel output signals and the operator ( )* represents the Hermetian conjugate (complex transpose). Equation 7 shows that the requirement is that the covariance of the output signals X must be full rank (or well-conditioned) to avoid wandering or instability in the adaptive filter to determine H'. Furthermore, for an online adaptive system, this condition should be met over a time period equal to the convergence time of the adaptive filter, which by design may be fairly short (100-200 ms).

The condition that X be suitably complex to avoid instability in the adaptive filter is rarely met in practice by multi-channel output. Furthermore, rendered output, particular in spatialized interactive voice communications, will see E{X*X} change suddenly between different active sources. Each time this occurs there is a potential for instability. In addition to this, there may be complex system processes, such as changes to volume and levelling that also causes shift, uncertainty and degeneracy in the covariance E{X*X}.

Design and simulation of this class of algorithms can promise up to 40 dB of echo reduction. Such models and algorithms in practice are generally able to achieve 20-30 dB of echo return loss enhancement (ERLE) or general reduction in the severity of the echo. The limiting factors are often related to system design challenges and the activities and events present in typical use cases.

In applications, such as hands free communications, where the acoustic echo is large and there is a need to remove it below perceptible levels, an additional stage may be used to suppress echo in a residual signal after echo cancellation has been applied. This is shown in FIG. 1, with the gain g 140 and the multiplicative application to the output signal indicating such approaches, resulting in signal S' 150. In practice, these approaches may include a feedback 160 from the residual signal after the echo canceller to adapt the filter H'120, and algorithms that may estimate the residual and therefore calculate an appropriate suppressor gain g 140. In sum, echo cancellation generally involves a model to predict the actual echo signal and subtract it from the incoming signal to leave the desired signal largely undistorted. Echo suppression, by contrast, may involve some estimation or heuristic to predict the presence of echo in a signal and applies a gain 140 which has impact on both the echo and desired signal.

Figure 2:
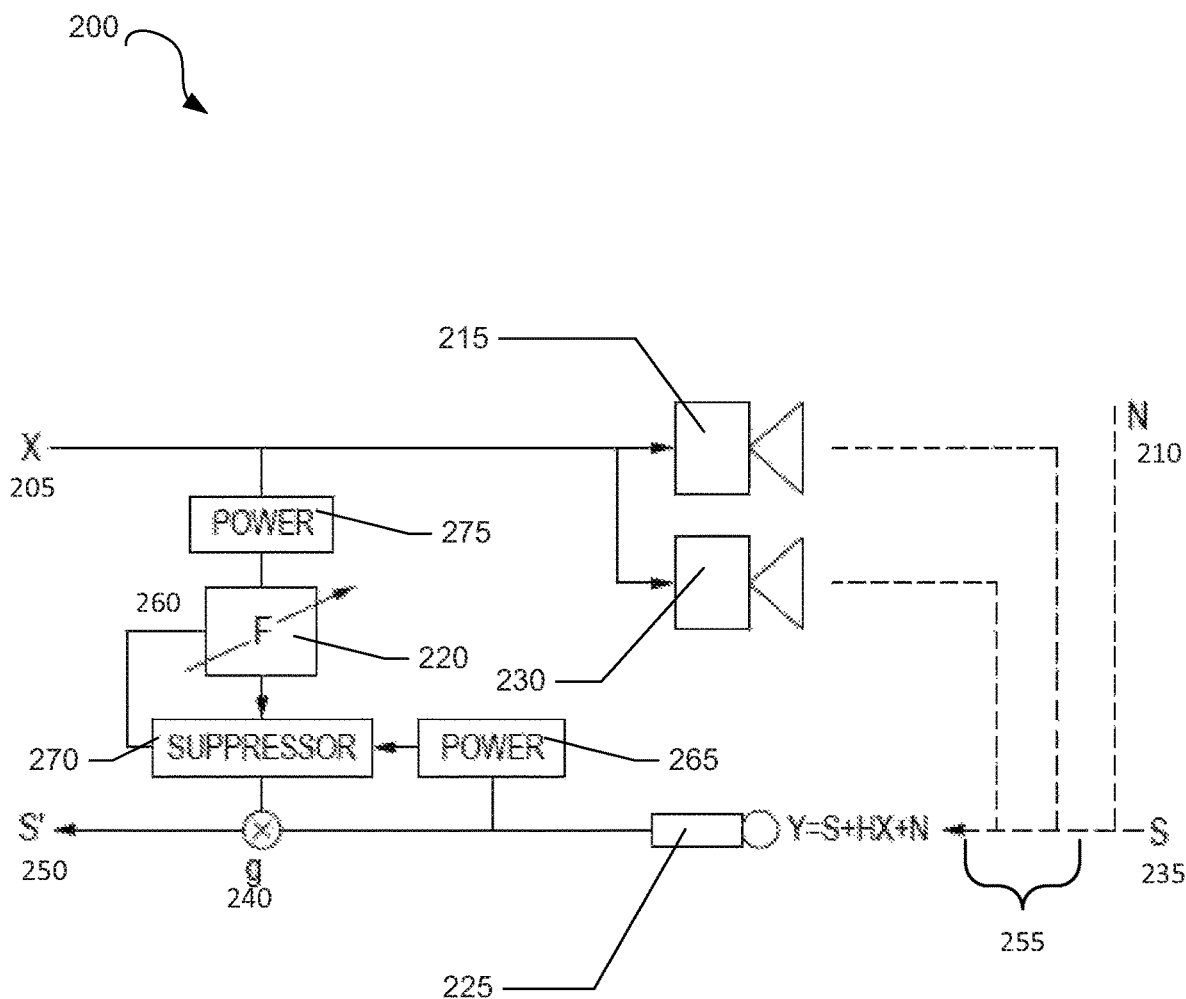
FIG. 2 shows a block diagram of a system providing adaptive echo suppression for an audio system, according to an embodiment.

In practice, the extent of suppression may often be guided by the operation and filters in the cancellation. However, this can become a circular challenge, as over short periods of time there may be uncertainty around any error in the residual signal. This uncertainty may indicate either a need to adapt the echo prediction, or the need to freeze the adaptation due to the presence of additional non-echo input. This circular challenge is often known as 'detecting double talk', where the presence of both echo and desired signal would destabilize the adaptive prediction of the echo. However, if the residual is caused by an error in the prediction of echo, the adaptation rate of the predictive filter should increase, to more accurately model the echo. The echo canceller, or prediction of echo is in a way used to estimate if there is additional signal activity in the decision to suspend adaptation, and this is circular logic. However, in some cases only an adaptive suppressor may be used to manage echo. This may be found in implementations where the echo is already fairly low, or where there is no suitably accurate reference—for example where there are timing errors or drift between the input and output audio paths. FIG. 2 shows a block diagram of a system 200 providing adaptive echo suppression for an audio system, according to an embodiment. System 200 shown in FIG. 2 includes multiple speakers 215 and 230 and a single microphone 225. As in FIG. 1, the signal at the microphone 225 is the combination of the desired signal S, the acoustic echo HX 255, and additional noise N 210. In the exemplary echo suppressor shown in system 200, only a statistical representation (for example power 275, also known as the banded power spectra) is taken from the reference channels. The filter F 220 may operate on a set of current time values 265 and previous time values 275 of the reference channel powers in order to create an estimation of the echo power in the incoming signal Y. The suppressor equation applied by echo suppression module 270, which is described in greater detail by commonly owned U.S. Pat. No. 9,173,025 entitled, Combined Suppression of Noise, Echo, and Out-of-Location Signals, filed Aug. 9, 2013 (which is incorporated in its entirety herein for all purposes, and referred to herein as the '025 patent) may be of the general form given in:

$$\text{Gain}_{NE} = \max\left(0.1, \left(\frac{\max(0, Y_b - \beta'_N N_b - \beta'_E E_b)}{Y_b}\right)^{GainExp}\right) \quad (8)$$

As in the echo canceller, the gains may be applied individually to each input channel, or more commonly a single gain g 240 is applied to all input channels to avoid short term spatial warping of the multi-channel input during echo.

The following equation is the expression for a prediction filter to create an estimate of the energy in band b at time t, where this is the result of summing over the set of channels c=1 ... C and a set of time instances τ=0 ... T−1 with $X_{c,b,t-\tau}$ representing the banded power values of the reference channel, for a given band at a past instance in time.

$$E_{b,t} = \sum_{c=1}^{C} \sum_{\tau=0}^{T-1} F_{c,b,\tau} X_{c,b,t-\tau}. \quad (9)$$

A simplification of using a single filter in the case of multiple channels of output may be expressed as:

$$E_{b,t} = \sum_{\tau=0}^{T-1} F_{b,\tau} \hat{X}_{b,t-\tau}, \quad (10)$$

where $$X_{b,t-\tau} = \sum_{c=1}^{C} X_{c,b,t-\tau}. \quad (11)$$

For a two-channel output, the filters may be approximately equivalent for the case of the power coupling from each of the output channels to the microphones being similar.

It was shown in other works, such as the '025 patent, that it is possible to have online adaptive identification of the echo coupling power. Following the longer derivation of the instability for the echo cancellation, if the reference covariance is not full rank the echo suppressor can fail to accurately adapt. Also, the use of the power coupling may be an approximation, and since the summing of the echo paths at the microphone is in the signal domain, this approximation can have error. Furthermore, when using the approximation in equation (11), based on the covariance the sum of the signal powers may incorrectly estimate the echo as this assumes the reference signals are uncorrelated. So, at a point in time, the adaptive suppressor may be stable and effectively suppressing the echo.

Regardless of whether there is an echo canceller or not, the suppressor has the challenge of trying to estimate the echo at its input and decide to suppress or pass through signal (in bands) based on the echo level and input signal level. Since there is also desired signal from time to time, if there is concurrent output audio (double-talk) the suppressor is not able to instantaneously determine the difference between a potential echo leak, and the onset of an external sound. This is a critical and circular decision point. A decision that there is external input typically also involves freezing the adaptive filter to avoid error in the echo estimation, so the leak may not be quickly removed. On the other hand, a decision in favor of any jump in signal being an increase in echo may lead to the echo prediction being biased high, and the system suppressing more external sound than necessary during double talk.

As stated above, both echo cancellation and echo suppression rely upon accurate estimation of echo. If the electroacoustic path cannot be accurately predicted, there is potential for underestimating the echo received by the microphone and/or misclassifying the echo as the signal of interest, which would allow the echo to "leak" through. However, if spatial audio rendering is applied, side band and/or additional information used to effect and change the rendering over time may be used to predict when excessive echo may exist. Because there is control of the audio system over the renderer, the audio system has available information about how input signal X is formed, and therefore prior knowledge of what the covariance will be (and thus, knowledge when the covariance will change). When change is implemented in the rendering control (e.g., in the rendering events described below), there is an increased likelihood in sudden change in the covariance of X, indicating that modified echo suppression would be beneficial. The below-described approach may use this side band information to modify echo suppression, advantageously providing better echo removal than conventional systems. Rather than a simple suppressor that depends on an echo suppressor to estimate the echo power, the present invention describes a separate adaptive echo suppressor which independently predicts the residual echo power after the cancellation. Such an approach is advantageous as the suppressor deals only with the residual after the canceller (which is generally lower), and may therefore be more robust to small system variations in response, timing and non-linearities.

Figure 3:
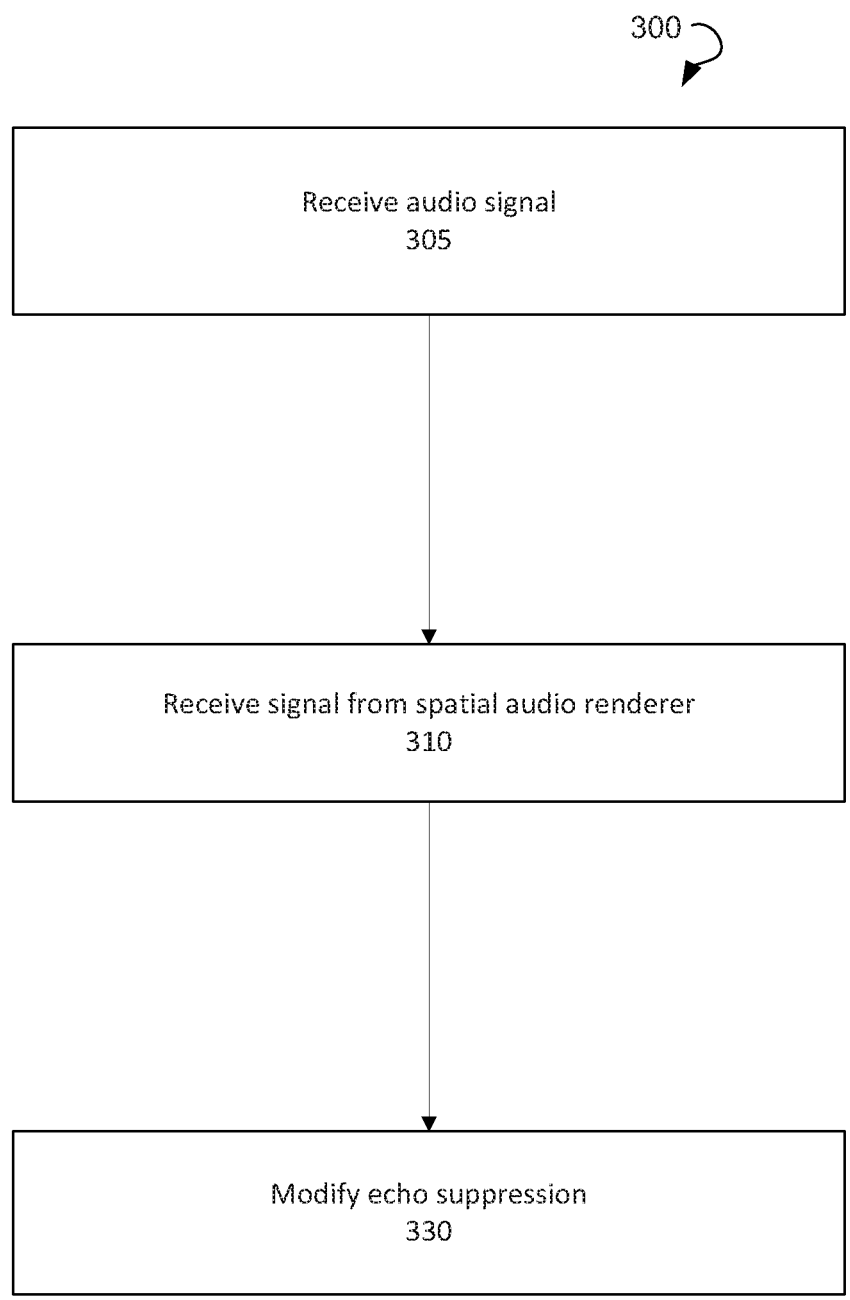
FIG. 3 shows a flow diagram for a method for detecting and compensating for inaccurate echo prediction, according to an embodiment.
Figure 4:
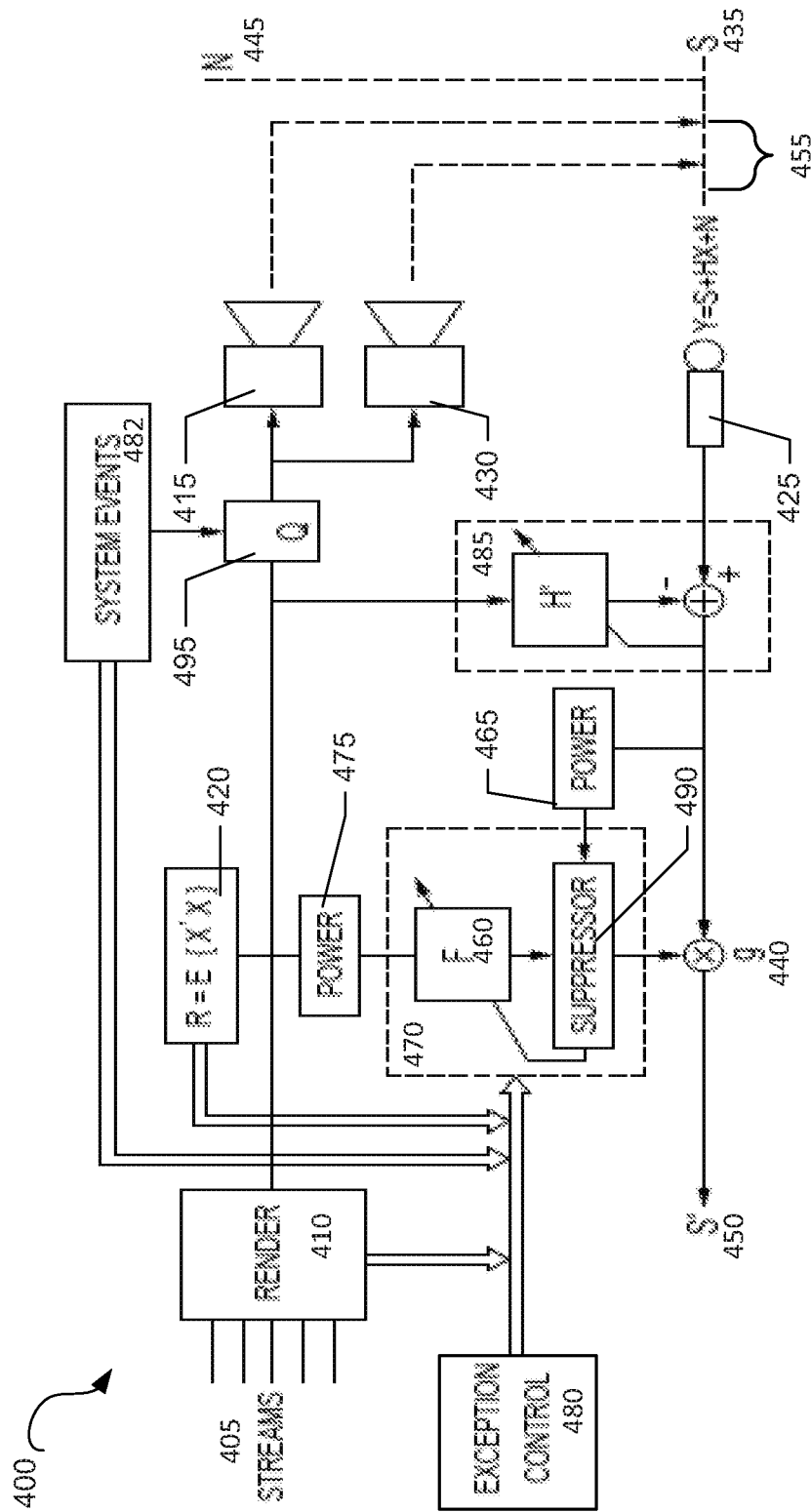
FIG. 4 shows a block diagram of a system for detecting and compensating for inaccurate echo prediction, according to an embodiment.

FIG. 3 shows a flow diagram for a method 300 for detecting and compensating for inaccurate echo prediction, according to an embodiment. FIG. 4 shows a block diagram of a system 400 for detecting and compensating for inaccurate echo prediction, according to an embodiment, which uses the method 300 to compensate for inaccurate echo prediction. The system 400 includes spatial audio renderer 410, microphone 425, speakers 415 and 430, echo canceller (which is optional) 485, echo suppressor 470, and control circuitry 480.

The core system that creates the electroacoustic echo, and design of the canceller 485 and suppressor 470 in system 400 may be substantially unchanged from the echo cancellers and suppressors described in FIGS. 1 and 2, other than the insertion of a set of processing or signal modification (Q) 495 that is downstream from the reference 475 applied to the outgoing signal. This is an important feature, as it will be generally where the class of system events has impact, and presents a definite failure mode of the echo cancellation which will be provided with an incorrect reference. Such unknown processing may be similar to what is known conventionally as 'echo path changes' however it is shown here before the speakers as it is often the case in practice that such uncertainty exists. The normal case of acoustic echo path change is not a main focus of the invention, though some system events may also involve a change in the acoustic echo path it is generally related to switching of hardware, movement of hardware or user movement and operation. A detailed set of system events are provided in a later section.

In method 300, the spatial audio renderer 410 may create output signals from received audio streams 405 that are played over speakers 415 and 430 after several additional electro-acoustic processing activities. The output signal from the speakers 415 and 430 may travel through the room with desired signal 435, echo 455 and noise 445 to form a summed signal. The signal may be received at a microphone 425 of an audio system at step 305. The signal including audio rendered using a spatial audio renderer 410 across a multi-channel audio output replayed over speakers 415 and 430. In the case of certain system designs, there may be an active rendering component 410 in place that creates the multichannel output intended for the speaker or acoustic output. Such a rendering engine typically takes streams of audio and uses additional spatial positioning information to apply filters and spatial steering as required for the application. In this way, the rendering engine may be responsible for much of the output diversity, and changes in the output diversity.

For example, a voice communications system may receive a set of mono voice sources which are then rendered spatially at the client. The diversity and rank of the output audio and reference covariance is then directly controlled from the number of streams present and the extent of switching, movement or other time varying filtering that is occurring in the renderer. A similar case may exist in interactive computer games where the complex spatial audio scene is comprised of a set of audio sources that are then filtered for a spatial impression using rendering control.

In such a system, the likelihood of multi-channel echo instability may be inferred from the state and changes of the state of the audio stream activity and rendering information in use to create the output spatial scene. In particular, the case known to cause problems and one that is detected with a simple heuristic in some embodiments involves a sequence where a) a subset, or a single stream is active and rendered with a linear time invariant filter to one spatial location for a period of time; and then b) a different audio stream or change in position of the first audio stream then causes a sudden change in the spatial excitation. Another problem that presents in practice and can create a system wide instability occurs where hold music or a voice prompt is the first audio in a spatial voice communications system. At the point where additional audio or participants join the call, the echo canceller can be in a drifted or wandering state and could cause an echo leak. The ability to have access to and monitor the rendering controls is may more directly determine the time of events that are likely to cause a sudden shift in the reference covariance. By knowing the timing of such events, the system 400 may adjust echo suppression accordingly to better protect against echo leakage.

Figure 5:
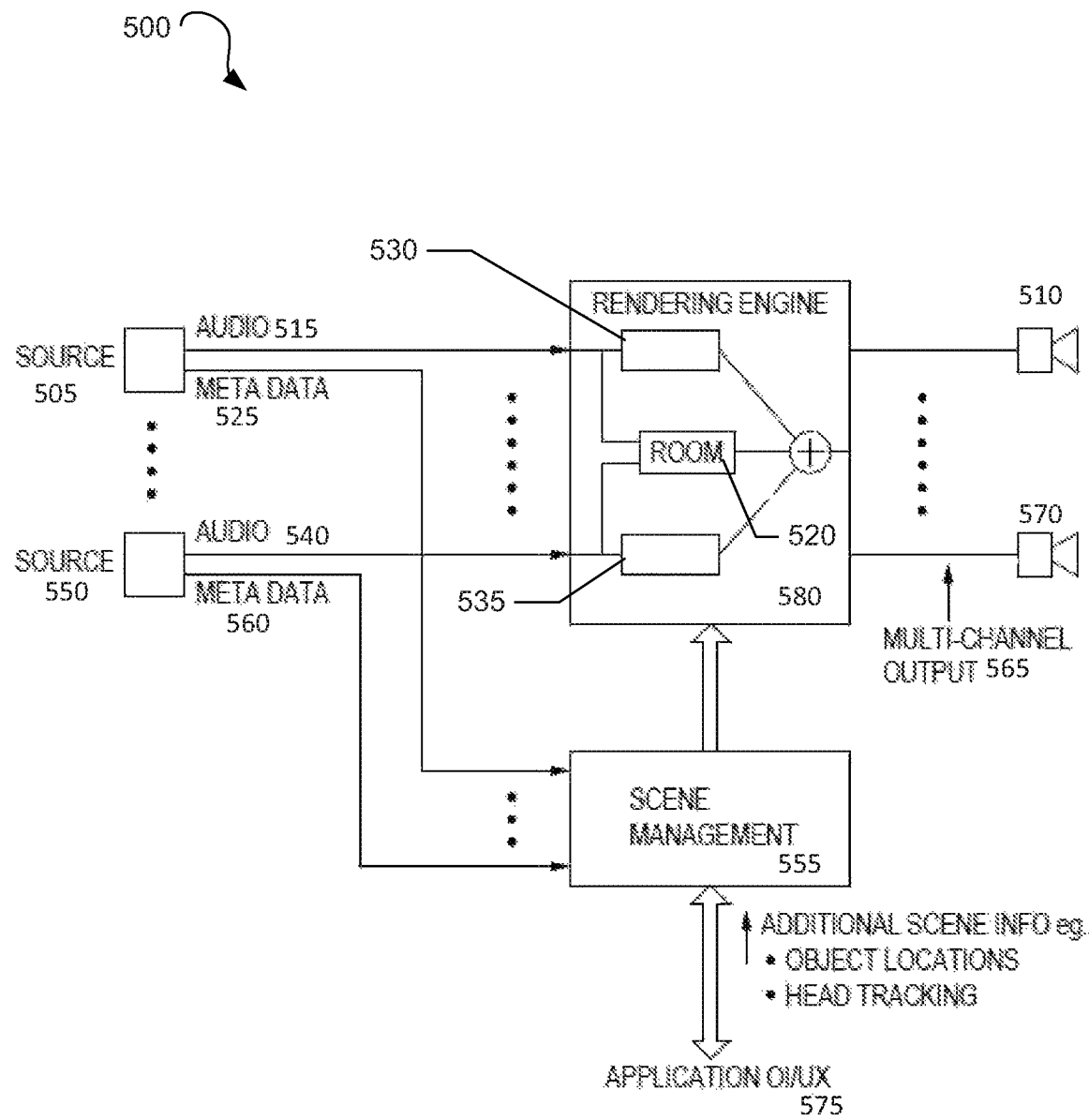
FIG. 5 shows a block diagram of a system providing spatial audio rendering for an audio system, according to an embodiment.

Accordingly, a signal may be received from the spatial audio renderer 410 (by exception control circuitry 480, for example) that indicates a change in rendering of audio at step 310. FIG. 5 shows a block diagram of a system 500 providing spatial audio rendering for an audio system, according to an embodiment, showing more detail on how the signal from the spatial audio renderer may be generated. System 500 includes two input streams 505 and 550, which are routed to rendering engine 580 (including panning elements 530 and 535 and spatial mapping element 520) and scene management module 555, which controls the rendering and also sends the signal 575 to the control circuitry 480 of FIG. 4. After rendering engine 580 has rendered the audio signals, the audio signals are forwarded to speakers 510 and 570 using multi-channel output signals 565.

Input streams 505 and 550 may include audio data 515 and 540 respectively, and additional metadata 525 and 560 respectively. The audio data from each source may include one or more channels of audio data. For example, a source may be a headset, in which case the audio would be a mono cleaned voice from that headset, and the side channel may be their user ID, talking flags, and potentially a position if they are moving around in some virtual space. If a source was a spatial conference phone, the side information may be just the room or user ID, and then the audio may include three channels (e.g. labeled WXY). The audio from each stream 515 and 540 may each be assigned some rendering parameters, which may control perceptual rendering properties such as distance, direction, diffusivity, equalization and room effects such as reverb.

The audio sources 505 and 550 may be local, interactive or streamed across some network. There is the option of additional local information that may include user interaction and further control of the desired placement of audio. The Scene Manager 555 is responsible for integrating the audio metadata and application information in order to create a set of controls for the Rendering Engine 580, which may perform all the audio signal processing in the rendering of the audio streams 505 and 550. The rendering control information 575 (which, in various embodiments, may include some of the stream metadata 525 and 560) may be transmitted to the control circuitry.

For a spatial source (a source where the associated audio stream has more than one channel), trigger an event if it has been silent or inactive (below −50 dB) for more than 20-30 seconds and then becomes active; and For a spatial source, trigger an event if the metadata indicates a change in the dominant source in the mix, for example swapping endpoints, and that endpoint has not been present or active in the mix for 30 seconds or more.

As the exemplary events listed above indicate, mono sources may be more sensitive to angle shifts than spatial sources. A mono channel, when rendered in one place with linear filter, adds Rank 1 to the X covariance. If a source is multi-channel—say N channels, it may add Rank N to the X covariance, sort of acting as an X' of its own being some set of channels that may have some unknown covariance from either an upstream renderer or a multiple microphone capture.

The suggested thresholds described above can be substantially changed to become more or less aggressive in determining events. In some embodiments, a fairly aggressive approach may be taken in determining events, and the over suppression time may be kept short. This may be well suited to voice interaction, causing only a brief loss of full duplex when a new source was active, but generally going unnoticed in the more common case of two endpoints over talking, or the infrequent case of a large number of endpoints producing non-distinct audio (for example laughing). Table 1 sets out exemplary modified echo suppression times associated with various rendering events.

TABLE 1

Heuristics used and modified echo suppression times associated with identified rendering events.

| Event | Cause and Characteristics | Method of Detection | Duration |
| --- | --- | --- | --- |
| MOVE | One or more active source with high energy in the rendering mix is rapidly moved - for example a rotation of the audio scene. | Changes in position that would cause changes in effective spatial mode of 3 dB. For conventional systems, this may correspond to a perceptual spatial angle change of 30 degrees in under one second as significant. | Duration of movement plus 100-200 ms |
| SWAP | Two streams with a fixed but different spatial rendering swap significantly in terms of dominance in the mixed scene. | Detection of the onset of a stream that was previously inactive for a period of several seconds. | 200-500 ms at onset of stream |
| SWITCH | A change in source of any stream, in particular a spatial stream fading between rooms or captured scenario. | Meta-data in the spatial stream may indicate the change of source, or specifically labelled spatial streams may swap in the mix. | 200-500 ms |
| CHANGE | A substantial change in the rendering mode or strategy. | This is generally a large parameter in the rendering engine, for example the width or number of channels in use. | 200-500 ms |

Using the control information 575, large changes to the output reference spatial excitation (i.e., covariance structure) may be predicted and used to modify echo suppression as described below. Rendering events, associated with changes in rendering of audio, may include:

For a mono source, with content over a threshold (for example −50 dB), trigger an event when the angle change effects a relative shift in any speaker output level of 6 dB or more;

For a mono source that becomes active, trigger an event if that source is at an angle that is associated with more than a 6 dB change in any speaker output level, provided that a source in that location has not been active in the last 10 seconds.

Returning to FIG. 3, after the signal from the spatial audio renderer has been received, the echo suppression applied to the received signal (e.g., by echo suppression module 470, using suppressor elements 460 and 490) may be modified in response to receiving the signal from the spatial audio renderer, the echo suppression attenuating pre-selected frequency bands of the received signal at step 330 using gain 440 to obtain echo-suppressed signal 450.

At step 330, the echo suppression may be modified in a variety of ways. For example, the echo suppression modification may include at least one of forcing adaptation of an echo suppression module (that applies the echo suppression to the received signal) and increasing an adaptation rate of the echo suppression module. By overriding any double-talk detector in the echo suppressor, the echo suppressor may be forced to adapt and the adaptive predictive filter may enter a very aggressive mode of finding and estimating any residual echo after the canceller. This may often cause an over-estimation of the echo, as during a forced adaption any local activity may be incorrectly identified and bias the adaptation of the echo power prediction filter. However, given this forced adaption is triggered on particular events, identified based on the signal from the spatial audio renderer as described above, where there is primarily a change in the output covariance (or rendering) the benefit of the over-sensitive suppressor adaption may outweigh the short term effect of over-suppression. After the instability event has been indicated for a time, as suggested in the tables above, the echo suppressor may quickly return to a lower or more accurate estimate of echo once the echo leak abates, and the adaption is no longer forced. After the signaled instability event, the echo suppressor will quickly return provided there is a period of active reference signal with typical echo and no additional local activity. Essentially, the result of this over suppression is a temporary, and usually unnoticed, reduction in duplex.

In further embodiments, the echo suppression may be based on a predicted echo power value derived from the residual signal (e.g., at block 475, for example). This predicted echo power value may be scaled to increase the predicted echo power value, making the echo suppression more sensitive to detected echo power. As set out in the '025 patent, a typical expression for the suppression gain on a given audio band is of the form:

$$\text{Gain}_{NE} = \max\left(0.1, \left(\frac{\max(0, Y_b - \beta'_N N_b - \beta'_E E_b)}{Y_b}\right)^{GainExp}\right) \quad (12)$$

In equation 12, $Y_b$ is the instantaneous input power, $N_b$ is the noise estimation and $E_b$ is the echo estimate from the predictor. The term $\beta'_E$ is a term greater than unity, and effectively a margin of error or a term to over predict the echo in calculating this gain. During times of echo leak, it is reasonably that the leak behavior has some reasonable correspondence with the general leak and instability. Therefore, a temporary increase in $\beta'_E$ is a convenient way to create a signal and previous echo path dependent echo estimate. In some embodiments, a value of $\beta'_E$=2-100 has been found to be of value by offering a margin for echo leak above the expected amount of 3-20 dB respectively.

In further embodiments, worst-case filter coefficients may be used to determine the predicted echo power value in response to detecting echo power or receiving identification of a condition, similarly making the echo suppression more sensitive to detected echo power in the residual signal. Note this may be the use of a temporary filter (with base still adapting) or may involve forcefully setting the adaptive filter to this value so that it then has to settle to a lower actual echo for given conditions. The '025 patent indicates the echo suppressor includes a step of predicting the current instantaneous echo at the input (after the echo canceller in this case). An exemplary formula for predicting the current instantaneous echo may be described as:

$$T_b = \sum_{l=0}^{L-1} F_{b,l} X_{b,l}. \quad (13)$$

In equation 13, the term $X_{b,l}$ represents a set of banded powers for the reference signal at a set of steps over time, and $F_{b,l}$ represents a filter with a set of taps for each band.

For a given system, or in general, there may be information available regarding the worst case amount of echo that could be expected. Such information may be used, for example, when the audio stream is started (e.g., a beginning of a call), where the echo filter coefficients are initialized to a large positive value. For example, the worst case echo may be estimated by assuming that there is no echo cancellation in place, and measuring the response from the outputs X to the microphone input across a large range of situations and expected device variance. Where the hardware is known, it is possible in this way to put an upper bound on the worst case echo that could occur should the echo cancellation or suppressor be totally ineffective. In another approach, a data driven technique may be used to create a large sample of test stimulus in line with what is expected in practice. The stability issues in the cancellation network or suppressor prediction error may be observed around the time of our event detection. In this case, it is possible to simulate the system without any additional signal of interest (double talk) other than normal background noise levels.

Therefore, in offline simulations, the typical estimation error or leakage may be estimated at the point of certain events. Since there is a large potential range of output signals and variables in practice that may influence this, such data driven approaches generally obtain some upper bound or reasonably conservative estimate of the leak caused by the detected events. The data driven approach may then come up with a filter coefficient or over estimation coefficient that is not as high as the worst case potential echo of the physical system. This is useful, particularly where the leakage and instability is very frequency dependent, as the tighter an upper bound on the potential echo energy leakage can be created as a function (filter prediction) of the current output X, the less the suppression and distortion of desired signal in order needs to be modified to prevent an echo at that level leaking through. The worst-case coefficients may then be utilized by forcing or setting the echo predictor filter value to this larger value:

$$F_{b,l} = F_{b,l}.\max. \quad (14)$$

In the simplest case, one embodiment involved using a single value for all taps of the filter, or a single tap across all time but varying with the frequency of the band. Respectively, this may be expressed as:

$$F_{b,l} = F \max; \quad (15)$$

and $$F_{b,l} = F_b.\max. \quad (16)$$

Given the detection of an event that may cause instability and leak in the echo suppressor (or echo canceller leak that then becomes a leak through the suppressor), multiple possible methods for control of the suppressor to cover this leak have been described. To fix the problem when it happens, rather than to try and outright solve the challenge of stability and leak in echo control. Table 2 is presented as a guide to the different embodiments for mitigating the echo leak, and the conditions, design or system knowledge characteristics that would lead to preferential use of one of the methods.

TABLE 2

Different modifications to echo suppression, based on data available from spatial audio renderer.

| | Requirements | | | |
|---|---|---|---|---|
| Approach | Knowledge of type of rendering used. | Knowledge of system and typical or worst case echo paths. | Knowledge of the event duration to sustain mitigation. | Notes |
| Temporary Over Estimation Margin | YES | YES | YES | Least aggressive. Needs more detail. |
| Forced Adaption | NO | NO | NO | Not suitable if high external signal levels. |
| Temporary Fixed Predictor (Worst Case) | NO | YES | YES | Aggressive approach. Worst case can be set very high if unknown. |
| Set Adaptive Filter to High Filter Value | NO | YES | NO | Aggressive but will stay high for as long as echo leak persists. Worst case can be very high value if system unknown. |

While the above modifications to echo suppression are generally most advantageous, other modifications may be used. For example, in an extreme case of echo (and perhaps even reference uncertainty), such as an unknown system sound being played downstream (Q), where the echo path is generally small enough to warrant suppression of a fixed absolute level, and still allow some meaningful capture (for example in a headset), a worst case echo level may be added into the suppression equation, ensuring no signal below that level would be passed without suppression. Yet another method of modifying echo suppression may use a temporary reduction in echo time specificity. Note this may be the use of a temporary filter (with base still adapting) or may involve forcefully setting the adaptive filter to this value so that it then has to settle to a lower actual echo for given conditions. Referring to equation (13) above, $F_{b,l}$ typically has most of its energy centered on the time step closest to the bulk echo path delay. That energy can be spread over time so as to reduce the time specificity of the echo energy estimate and so deal with uncertainty not just in echo energy but also echo path latency.

Figure 6:
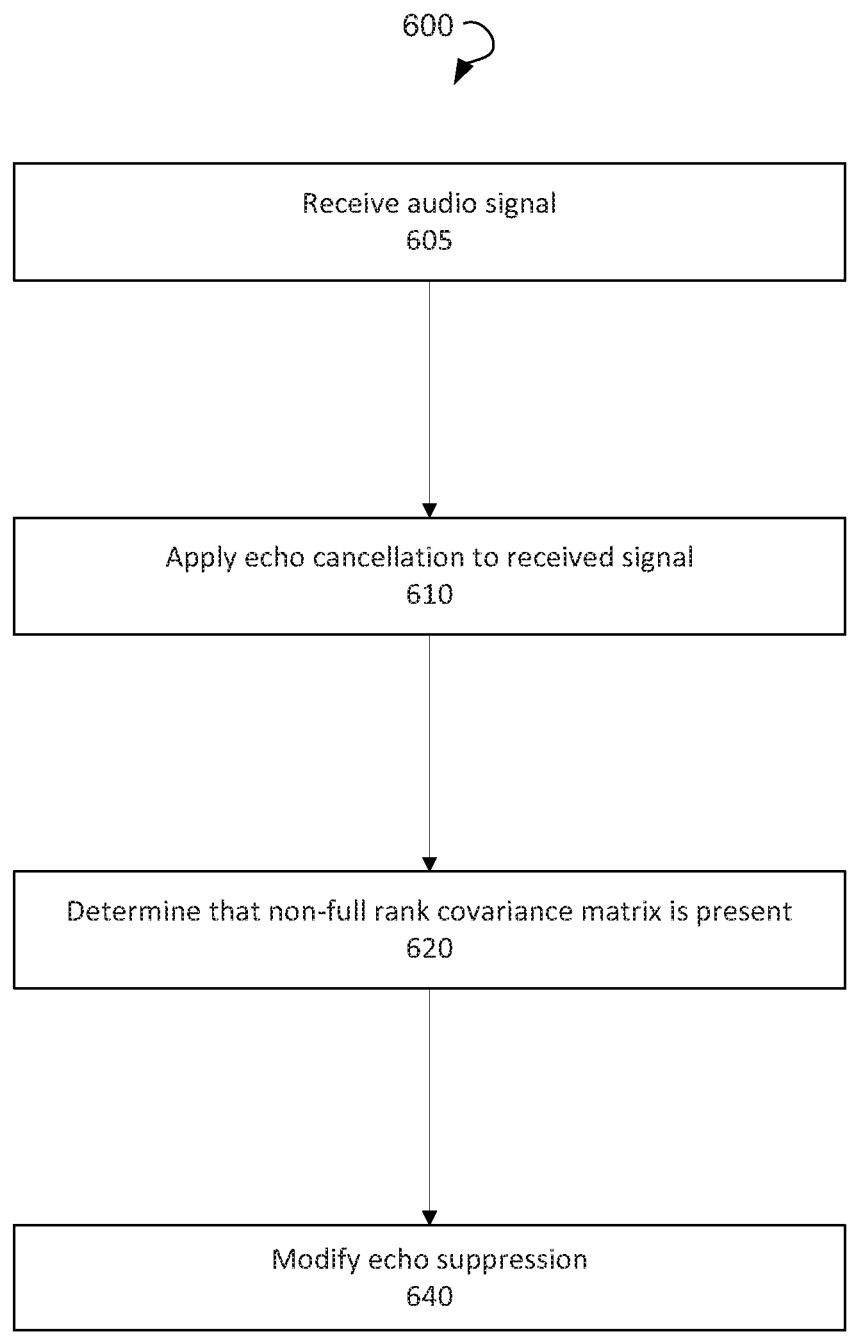
FIG. 6 shows a flow diagram for a method for detecting and compensating for echo cancellation instability, according to an embodiment

Method 300 of FIG. 3 focuses on the case where a rendering event indicates to the system 400 that the echo estimation, used in echo suppression, echo cancellation, or both, may be inaccurate, and that increase echo suppression may be beneficial. However, other detection methods may be used to indicate to the audio system that echo suppression should be modified. FIG. 6 shows a flow diagram for a method 600 for detecting and compensating for echo cancellation instability, according to an embodiment, when a covariance change indicates an increased likelihood of inaccurate echo estimation. In method 600, a signal may be received at a microphone 425 of an audio system at step 605, as described above. At step 610, echo cancellation may be applied to generate a residual signal, as described above with respect to FIG. 1. The echo cancellation, which may be applied by echo cancellation circuitry 485, may include subtracting a predicted echo from the received signal. The predicted echo may be based on an estimate of an electroacoustic path 455 from speakers 415 and 430 of the audio system to the microphone 425.

At step 620, the audio system may determine that a non-full rank covariance matrix is being used in determining the predicted echo. Different techniques may be used for creating the expectation value (which is essentially a mean). For example, a filter may be used such that is R=filter {X*X}. The instantaneous X*X may, in an embodiment, be strictly rank one for a single observation, though this figure may be estimated over frequency. That is $$R\_b = \sum_{f=f\_o}^{f\_n} X\_f^{\wedge} * X\_f \quad (17)$$

$$R_b = \sum_{f=f_0}^{f_n} X_f^* X_f$$

So a set of X'X for a set of frequency bins (from some banded transform) are stacked together. This may only work for small frequency ranges—for example G $f_n - f_0 < f_0/5$, otherwise time delay issues may arise. Another way of estimating R, which is usually almost suitable may be a first-order filter expressed as:

$$R = \text{alpha } R + (1 - \text{alpha})X^*X \quad (18)$$

where alpha=log (1/T). T may be the number of frames, or time instances that X*X is equal to the time constant for the estimation. Generally, it is desirable for alpha $>(N-1)/N$ for a set of N channels so that enough observations are present for the rank of R to be dominated by the diversity in X across the number of channels, and not dominated by the number of observations that go into the estimation of the mean.

As stated previously, the problem of multi-channel adaption instability may when the covariance R=E{X*X} 420 is not full rank. That is, during such time the estimate of the echo path H' of echo suppressor 485 can wander with one or more degrees of freedom. During this time, the actual echo may still be cancelled. Elaborating on the above discussion, this is the definition that (H−H')X and (H−H'−K)X are equivalently effective at calculating the single channel echo estimate. The problem of instability or wander manifests at the point where the covariance suddenly changes, such that $$K R_0 K^* = 0 \text{ but } K R_1 K^* > 0. \quad (19)$$

Where $R_0$ and $R_1$ are the covariance matrix at two instances in time where the additional filter state K has not had sufficient time to be adaptively removed with H' returning to an approximation of H.

Consider R=U W U* as the Eigen decomposition of R, with W a diagonal matrix of positive Eigen values (since R is Hermetian and positive definite), and U a matrix where each column represents an Eigenvector or R. The problem of full rank or poor conditioning of R is equivalent to the number of non-zero Eigen values. Specifically, if $w_n$ is considered to be the set of diagonal elements of W in decreasing order, and $u_n$ the set of associated Eigen vectors or columns of U, then $K R_0 K^* = 0$ if and only if K is some linear combination of the Eigen vectors $u_{0,n}$ for which $w_{0,n}=0$. Therefore $K R_1 K^* > 0$ if and only if, the previous Eigenvectors or $R_0$ now have a non-zero projection into the space of new Eigen vectors $u_{1,n}$ for which $w_{1,n} > 0$. Of course, in practice it would be desirable to generalize this to the case where previous Eigen vectors of R that have a low Eigen value are aligned with current Eigen vectors that have a larger Eigen value—excitation which previously cancelled out or did not create much signal at t.

Given the reference covariance matrices $R_0$ and $R_1$ across some time interval, a measure for the potential for leak caused by a sudden shift of the excitation or multi-channel diversity that causes a previously less excited combination of the outputs become suddenly excited would be useful. The simplest example of this would be an output that was previously degenerate in the form of one channel being inactive or low, and then that same channel suddenly becoming active. An example of this situation would be as if a sound was panned from one active channel to a previously idle channel.

In general though a much larger class of potential changes in the reference or output covariance are of interest. For example, with a two channel output, the output signal may suddenly change from exciting both channels in phase, to exciting both channels substantially out of phase (inverted). In this case, whilst both channels are active before and after the event of change in the covariance, there is a substantial change in the structure or Eigen decomposition of the covariance, where one mode or Eigenvector that was previously not excited has become significantly excited.

Here a metric may be used to define this potential change in excitation, whereby there may have been a degeneracy or potential space for the adaptive filter to wander, and then become excited. In such a situation, as shown above, there is potential for an unknown state in the echo canceller to not represent the real electroacoustic echo path and therefore cause an error in the prediction of the echo signal, and therefore a leak. Given two instances of the covariance matrix $R_0$ and $R_1$ a scalar function $d(R_0, R_1)$ may be used with some or all of the following properties:

1. The measure is largely scale invariant, such that $d(R_0, R_1) \sim d(\alpha R_0, \beta R_1)$.
2. The measure is not necessarily symmetric $d(R_0, R_1) \neq d(R_1, R_0)$
3. The measure is larger when the initial matrix has lower rank (or more generally a higher conditioning number)

$$d(R_0, R_1) \geq d(R_1, R_0) \text{ if } \text{rank}(R_1) > \text{rank}(R_0)$$

The property 1 is convenient as the echo cancellation and suppression network is, by design, sensitive and scaled to the energy of the reference. In the case of very small prior excitation ($\text{trace}(R_0) \ll \text{trace}(R_1)$) we may choose to design a measure to have larger value to utilize any method of managing potential echo leak for managing sudden onset of echo energy.

The following measure is presented as one particular embodiment with this set of properties and a useful $$|\text{trace}(W_0)(W_0+\alpha I)^{-1} U_0^* U_1 W_1 \text{ trace } (W_1+\beta I)^{-1}|$$

This method may be of most use where the multi-channel output signal is generated from some upstream source, and no additional information is available about the construction and rendering of the signal.

As described above, the echo suppression applied to the received signal (e.g., by echo suppression module 470) may then be modified in response to the determination that the non-full rank covariance matrix is being used, the echo suppression attenuating pre-selected frequency bands of the received signal at step 640.

In addition to spatial audio rendering events and non-full-rank covariance matrix detection, system events may also cause the system 400 to modify echo suppression according to several embodiments. The following presents a table of what is called system events in this disclosure, a particular method of technique of detecting such events, and a duration that such an event may cause leak—which relates to the duration over which the system would influence the adaptive suppressor. The system events may cause a signal to be sent by signal event module 482 to modify the echo suppression in any of the methods described above.

In Table 3 below, the duration column may be considered the length of a period with significant output audio signal, or the length of time that a leak in the AEC may occur for. Generally this is of the same time as the AEC adaption time (100-1000 ms) though in some severe cases where the AEC may be very disturbed, there is ongoing uncertainty, or the change in state (H') required is very large, this time would be longer.

TABLE 3

Heuristics used and modified echo suppression times associated with identified system events

| Event | Cause and Characteristics | Method of Detection | Duration |
|---|---|---|---|
| START | When first starting no information on the echo path may be present, and short term leak is expected. | First initialization of processing. First audio to pass through processing after a period of very low signal. Software flag signalling a restart. | 100-200 ms |
| GAP | The processing may be paused for a period of time, or passed zero signal during rerouting or other system control. | Flag passed to processing to indicate a gap. Detection of a period of absolute zero signal on the microphone input. Assume gap in both mic signal and reference. | 200-500 ms at gap boundary (end in particular) |

TABLE 3-continued

Heuristics used and modified echo suppression times associated with identified system events

| Event | Cause and Characteristics | Method of Detection | Duration |
|---|---|---|---|
| MUTE | Microphone muted. | Link to UI and/or flag to processing. Detection of absolute zero or stable and very low signal on mic. | 200-500 ms at mute off. |
| VOLUME | Change of the speaker volume or general bulk gain applied in Q. | Volume change asserted by UI. Direction of change and amount of change may or may not be indicated. Flag into processing. | 100-200 ms to 1-2 s for small/large changes |
| DEVICE | The output or input device is changed. | System level event in most new OS for digitally connected devices. May test similar to GAP, or large spike common when analog mic is changed. | 1-2 s to allow forgetting old filter state. |
| LID | The lid of a laptop is moved, or orientation is changed of a tablet. | System level detection of lid open/close or device rotation. Movement detection of camera feed during video call. | 100-200 ms Smaller change |
| MOVE | Device is physically moved or moving. One example of a particular use case Dolby has encountered is moving a device from lap to desk | Use of internal accelerometer or OS integrated position system. Movement detection of camera feed during video call. | Duration of movement + 1-2 s |
| OBJECT | Significant object moved or moving near the input device. | UI activity is an indicator of user hands and body. Doppler shift in high frequency pilot tones played out speakers can detect nearby movement. Movement detection of camera feed during video call. | Duration of significant object movement + 1-2 s |
| TIMING | A system timing or buffering event may cause a change in latency or gap in reference or input signal. | Timing errors can be observed by monitoring the audio IO subsystem for buffer overruns or un-serviced interrupts. This is often provided in system implementation. | 200-500 ms if a gap (acoustic response length) or 1-2 if potential latency change |
| GLITCH | A fault in audio subsystem may cause a block of repeated or erroneous data. | Unexpected full scale saturation or short blocks of noise on the reference or microphone may represent a glitch. This is probably a bigger issue than echo leak. | 200-500 ms after glitch to conceal any leaks |
| LIMITER | A downstream (Q) limiter or 'SmartAmp' is applying rapid time varying gain, particularly to higher level peaks. AEC will leak as reference is incorrect. | Detection from the activity and level of the reference. ** Note that this event may be more useful to also freeze adaption of the AEC so it remains closer to the nominal electroacoustic path. | 20-100 ms or the position an d length of the peaks. |
| UPMIX | A downstream static filter is changed, or there is a time varying process that converts the output channels known at the reference to a larger (or smaller) number of output speaker channels. | System event may note the upmixer change - mode selection if there is downstream processing. | |
| USER | The ability of a user or remote agent in the conference to signal a possible echo problem. | Detection and control of this is external. | 10 s + Stay conservative until fault or control is cleared. |
| MODE | The system changes mode and alters bandwidth, frequency response and/or noise level. Most relevant for USB/Bluetooth | System level event in most new OS for digitally connected devices | 1-2 s to allow forgetting old filter state. |
| OCCLUSION | An object such as a camera privacy sticker is placed so as to occlude the microphone ports Leads to echo path change and significantly higher sensitivity to internal noise and handling | Blanking of video feed. Handling noise detection on microphone | Duration of occlusion + 1-2 s |

Three primary groups of detection and three specific techniques for temporarily controlling or influencing the echo suppressor and its adaptation have been described. These may be used individually or in combination to achieve a set of potential embodiments. An exemplary embodiment, including the embodiment shown in FIG. 4, may use the full set of detectors and a selection of suppressor control based on the type of event.

Figure 7:
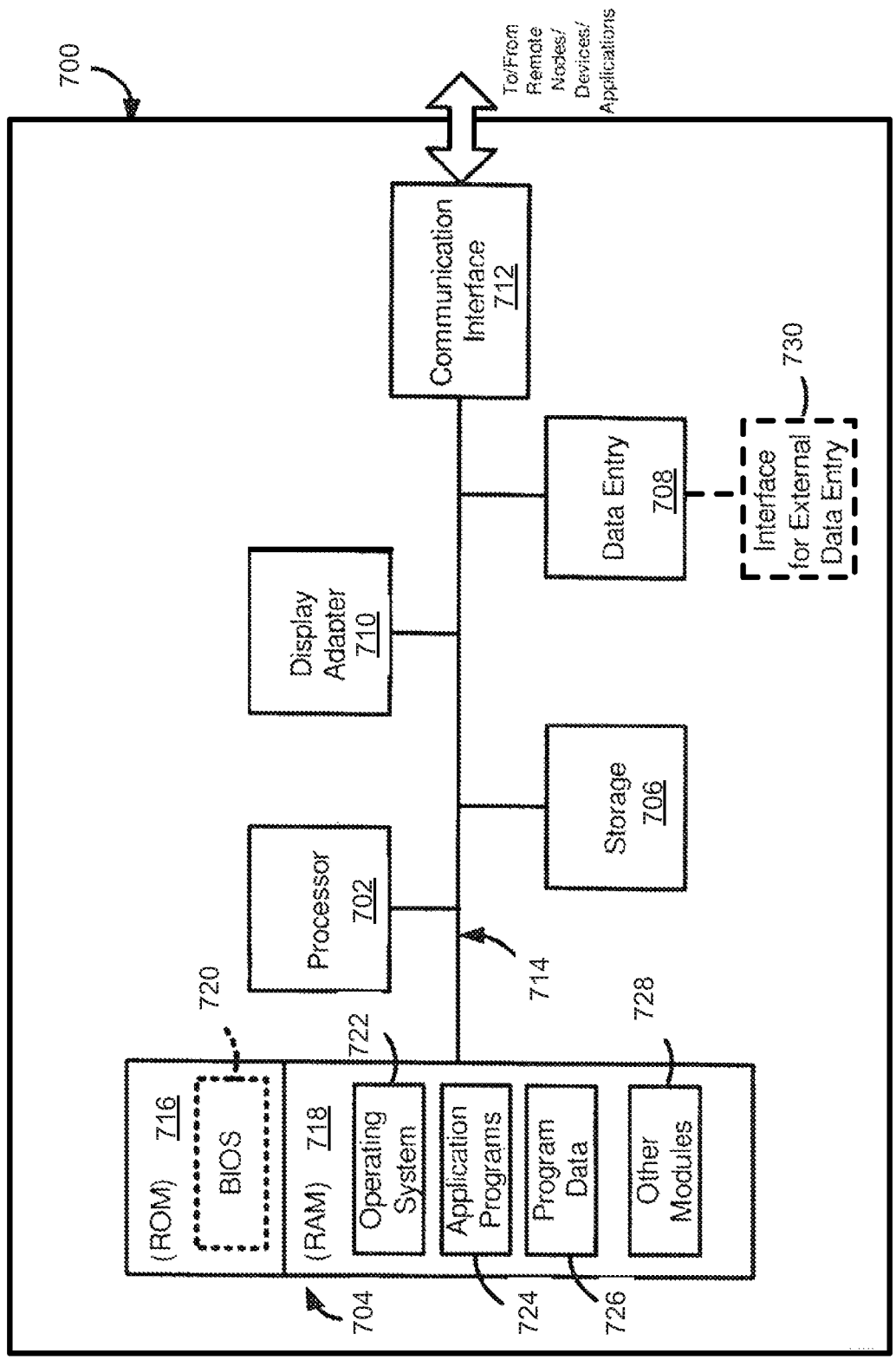
FIG. 7 is a block diagram of an exemplary system for detecting and compensating for echo cancellation instability, according to an embodiment.

FIG. 7 is a block diagram of an exemplary system for providing dynamic suppression of non-linear distortion according to various embodiments of the present invention. With reference to FIG. 7, an exemplary system for implementing the subject matter disclosed herein, including the methods described above, includes a hardware device 700, including a processing unit 702, memory 704, storage 706, data entry module 708, display adapter 710, communication interface 712, and a bus 714 that couples elements 704-712 to the processing unit 702.

The bus 714 may comprise any type of bus architecture. Examples include a memory bus, a peripheral bus, a local bus, etc. The processing unit 702 is an instruction execution machine, apparatus, or device and may comprise a microprocessor, a digital signal processor, a graphics processing unit, an application specific integrated circuit (ASIC), a field programmable gate array (FPGA), etc. The processing unit 702 may be configured to execute program instructions stored in memory 704 and/or storage 706 and/or received via data entry module 708.

The memory 704 may include read only memory (ROM) 716 and random access memory (RAM) 718. Memory 704 may be configured to store program instructions and data during operation of device 700. In various embodiments, memory 704 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAM-BUS DRAM (RDRAM), for example. Memory 704 may also include nonvolatile memory technologies such as nonvolatile flash RAM (NVRAM) or ROM. In some embodiments, it is contemplated that memory 704 may include a combination of technologies such as the foregoing, as well as other technologies not specifically mentioned. When the subject matter is implemented in a computer system, a basic input/output system (BIOS) 720, containing the basic routines that help to transfer information between elements within the computer system, such as during start-up, is stored in ROM 716.

The storage 706 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 700.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 706, ROM 716 or RAM 718, including an operating system 722, one or more applications programs 724, program data 726, and other program modules 728. A user may enter commands and information into the hardware device 700 through data entry module 708. Data entry module 708 may include mechanisms such as a keyboard, a touch screen, a pointing device, etc. Other external input devices (not shown) are connected to the hardware device 700 via external data entry interface 730. By way of example and not limitation, external input devices may include a microphone, joystick, game pad, satellite dish, scanner, or the like. In some embodiments, external input devices may include video or audio input devices such as a video camera, a still camera, etc. Data entry module 708 may be configured to receive input from one or more users of device 700 and to deliver such input to processing unit 702 and/or memory 704 via bus 714.

The hardware device 700 may operate in a networked environment using logical connections to one or more remote nodes (not shown) via communication interface 712. The remote node may be another computer, a server, a router, a peer device or other common network node, and typically includes many or all of the elements described above relative to the hardware device 700. The communication interface 712 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 712 may include logic configured to support direct memory access (DMA) transfers between memory 704 and other devices.

In a networked environment, program modules depicted relative to the hardware device 700, or portions thereof, may be stored in a remote storage device, such as, for example, on a server. It will be appreciated that other hardware and/or software to establish a communications link between the hardware device 700 and other devices may be used.

It should be understood that the arrangement of hardware device 700 illustrated in FIG. 7 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 700. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 7. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter may be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

Systems and methods are described for compensating for inaccurate echo prediction in audio systems. A signal may be received at a microphone of an audio system, the signal including audio rendered using a spatial audio renderer across a multi-channel audio output. A signal may be received from the spatial audio renderer that indicates a change in rendering of audio. The signal from the spatial audio renderer may, in some embodiments, further include an identification of a change type associated with the change in rendering of audio. The echo suppression applied to the received signal may be modified in response to receiving the signal from the spatial audio renderer, the echo suppression attenuating pre-selected frequency bands of the received signal. In some embodiments, the echo suppression may be applied over a predetermined time interval associated with the identified change type.

The echo suppression may be modified in a variety of ways. For example, the echo suppression modification may include at least one of forcing adaptation of an echo suppression module (that applies the echo suppression to the received signal) and increasing an adaptation rate of the echo suppression module in response to receiving the signal from the spatial audio renderer. In other embodiments, the echo suppression may be based on a predicted echo power value based on the residual signal. This predicted echo power value may be scaled, e.g. by a constant value, to increase the predicted echo power value, and then pre-selected frequency bands of the received signal may be attenuated based on the scaled predicted echo power value. In other embodiments, worst-case filter coefficients may be used to determine the predicted echo power value in response to detecting echo power or receiving identification of a condition, similarly making the echo suppression more sensitive to detected echo power in the residual signal.

The method may also include the step of applying, by the audio system, echo cancellation to the received signal to generate a residual signal. The echo cancellation may include subtracting a predicted echo from the received signal that is based on an estimate of an electroacoustic path from speakers of the audio system to the microphone. The echo cancellation may be applied to the residual signal. Also, in further embodiments, other conditions may signal to the audio system that the modified echo suppression may be beneficial. Such conditions may include system events of the audio system and/or determining that a non-full rank covariance matrix is being used in echo cancellation.

An audio system is also described herein that includes a spatial audio renderer, a microphone, an adaptive echo suppressor circuit, and a control circuit. The spatial audio renderer may render audio across a multi-channel audio output. The microphone captures a signal that includes the rendered audio. The adaptive echo suppressor circuit may suppress echo in the received signal by attenuating pre-selected frequency bands of the received signal. The control circuit, coupled to the adaptive echo suppressor circuit and the spatial audio renderer, may receive a signal from the spatial audio renderer that indicates a change in rendering of audio. The control circuit, in response to receiving the signal from the spatial audio renderer, may cause the adaptive echo suppressor circuit to modify echo suppression applied to the received signal, the echo suppression attenuating pre-selected frequency bands of the received signal.

The echo suppression may be modified in a variety of ways. For example, the adaptive echo suppressor circuit may modify echo suppression by performing at least one of forcing adaptation of an echo suppression module (that applies the echo suppression to the received signal) and increasing an adaptation rate of the echo suppression module in response to receiving the signal from the spatial audio renderer. In other embodiments, the echo suppression may be based on a predicted echo power value based on the residual signal. This predicted echo power value may be scaled, e.g. by a constant value, to increase the predicted echo power value, and then pre-selected frequency bands of the received signal may be attenuated based on the scaled predicted echo power value. In other embodiments, worst-case filter coefficients may be used to determine the predicted echo power value in response to detecting echo power or receiving identification of a condition, similarly making the echo suppression more sensitive to detected echo power in the residual signal.

The audio system may also include an echo cancellation circuit communicatively coupled to the control circuit. The echo cancellation circuit may receive the signal from the microphone and apply echo cancellation to the received signal to generate a residual signal. The echo cancellation may include subtracting a predicted echo from the received signal that is based on an estimate of an electroacoustic path from speakers of the audio system to the microphone. The echo cancellation may be applied to the residual signal. Also, in further embodiments, other conditions may signal to the audio system that the modified echo suppression may be beneficial. Such conditions may include system events of the audio system and/or determining that a non-full rank covariance matrix is being used in echo cancellation.

Various aspects of the present invention may be appreciated from the following enumerated example embodiments (EEEs):

EEE1. A method for detecting and compensating for inaccurate echo prediction, the method comprising:
receiving a signal at a microphone of an audio device, the signal including audio rendered using a spatial audio renderer across a multi-channel audio output of the audio device;
receiving a signal from the spatial audio renderer that indicates a change in rendering of audio; and
modifying echo suppression, by the audio device after the signal from the spatial audio renderer has been received, applied to the received signal in response to receiving the signal from the spatial audio renderer, the echo suppression attenuating pre-selected frequency bands of the received signal.

EEE2. The method of EEE 1, the modifying echo suppression comprising at least one of: forcing adaptation of an echo suppression module that applies the echo suppression to the received signal; and increasing an adaptation rate of the echo suppression module.

EEE3. The method of EEE 1 or EEE 2, the applying echo suppression comprising determining a predicted echo power value based on the received signal, scaling the predicted echo power value by a constant value such that the predicted echo power value is increased, and attenuating pre-selected frequency bands of the received signal based on the scaled predicted echo power value.

EEE4. The method of any of EEEs 1-3, the applying echo suppression comprising determining a predicted echo power value based on the received signal and predetermined worst-case filter coefficients, and attenuating pre-selected frequency bands of the received signal based on the predicted echo power value.

EEE5. The method of any of EEEs 1-4, the signal from the spatial audio renderer further comprising an identification of a change type associated with the change in rendering of audio, the applying echo suppression taking place over a predetermined time interval associated with the identified change type.

EEE6. The method of any of EEEs 1-5, further comprising applying, by the audio device, echo cancellation to the received signal to generate a residual signal, the echo cancellation comprising subtracting a predicted echo from the received signal, the predicted echo being based on an estimate of an electroacoustic path from speakers of the audio device to the microphone, the echo cancellation being applied to the residual signal.

EEE7. The method of EEE 6, further comprising determining, by the audio device, that a non-full rank covariance matrix is being used in the echo cancellation and modifying echo suppression, by the audio device, applied to the received signal in response to the determination that the non-full rank covariance matrix is being used.

EEE8. The method of any of EEEs 1-7, further comprising receiving an indication of a system event of the audio device and modifying echo suppression, by the audio device, applied to the received signal in response to receiving the indication of the system event.

EEE9. A computer program product comprising computer-readable program code to be executed by one or more processors when retrieved from a non-transitory computer-readable medium, the program code including instructions to:
receive a signal at a microphone of an audio device, the signal including audio rendered using a spatial audio renderer across a multi-channel audio output of the audio device;
receive a signal from the spatial audio renderer that indicates a change in rendering of audio; and
modify echo suppression, by the audio device after the signal from the spatial audio renderer has been received, applied to the received signal in response to receiving the signal from the spatial audio renderer, the echo suppression attenuating pre-selected frequency bands of the received signal.

EEE10. The computer program product of EEE 9, the applying echo suppression comprising at least one of:
forcing adaptation of an echo suppression module that applies the echo suppression to the received signal; and increasing an adaptation rate of the echo suppression module.

EEE11. The computer program product of EEE 9 or EEE 10, the program code further including instructions to determine that a non-full rank covariance matrix is being used in the echo cancellation and instructions to modify the echo suppression applied to the received signal in response to the determination that the non-full rank covariance matrix is being used.

EEE12. The computer program product of any of EEEs 9-11, the applying echo suppression comprising determining a predicted echo power value based on the received signal, scaling the predicted echo power value by a constant value such that the predicted echo power value is increased, and attenuating pre-selected frequency bands of the residual signal based on the scaled predicted echo power value.

EEE13. The computer program product of any of EEEs 9-12, the applying echo suppression comprising determining a predicted echo power value based on the received signal and predetermined worst-case filter coefficients, and attenuating pre-selected frequency bands of the residual signal based on the predicted echo power value.

EEE14. The computer program product of any of EEEs 9-13, the signal from the spatial audio renderer further comprising an identification of a change type associated with the change in rendering of audio, the applying echo suppression taking place over a predetermined time interval associated with the identified change type.

EEE15. The computer program product of any of EEEs 9-14, the program code further including instructions to apply echo cancellation to the received signal to generate a residual signal, the echo cancellation comprising subtracting a predicted echo from the received signal, the predicted echo being based on an estimate of an electroacoustic path from speakers of the audio device to the microphone, the echo suppression being applied to the residual signal.

EEE16. An audio device or system comprising:
a spatial audio renderer that renders audio across a multi-channel audio output;
a microphone that captures a signal, the signal including the rendered audio;
an adaptive echo suppressor circuit that suppresses echo in the received signal, the echo suppression attenuating pre-selected frequency bands of the received signal; and
a control circuit coupled to the adaptive echo suppressor circuit and the spatial audio renderer, the control circuit receiving a signal from the spatial audio renderer that indicates a change in rendering of audio, and causing the adaptive echo suppressor circuit to modify echo suppression applied to the received signal in response to receiving the signal from the spatial audio renderer, the echo suppression attenuating pre-selected frequency bands of the received signal.

EEE17. The audio device or system of EEE 16, the causing the adaptive echo suppressor circuit to modify echo suppression comprising at least one of:
forcing adaptation of the adaptive echo suppressor circuit; and
increasing an adaptation rate of the adaptive echo suppressor circuit.

EEE18. The audio device or system of EEE 16 or EEE 17, the causing the adaptive echo suppressor circuit to modify echo suppression comprising determining a predicted echo power value based on the received signal, scaling the predicted echo power value by a constant value such that the predicted echo power value is increased, and attenuating pre-selected frequency bands of the received signal based on the scaled predicted echo power value.

EEE19. The audio device or system of any of EEEs 16-18, further comprising an echo cancellation circuit communicatively coupled to the control circuit, the echo cancellation circuit receiving the signal from a microphone and applying echo cancellation to the received signal to generate a residual signal, the echo cancellation comprising subtracting a predicted echo from the received signal, the predicted echo being based on an estimate of an electroacoustic path from speakers of the audio device to the microphone, the echo suppression being applied to the residual signal received from the echo cancellation circuit.

EEE20. The audio device or system of any of EEEs 16-19, the signal from the spatial audio renderer further comprising an identification of a change type associated with the change in rendering of audio, the applying echo suppression taking place over a predetermined time interval associated with the identified change type.

EEE21. A method for detecting and compensating for echo cancellation instability, the method comprising:
receiving a signal at a microphone of an audio device, the signal including audio rendered using a spatial audio renderer across a multi-channel audio output of the audio device;
applying, by the audio device, echo cancellation to the received signal to generate a residual signal, the echo cancellation comprising subtracting a predicted echo from the received signal, the predicted echo being based on an estimate of an electroacoustic path from speakers of the audio device to the microphone;
determining, by the audio device, that a non-full rank covariance matrix is being used in determining the predicted echo; and
modifying echo suppression, by the audio device, applied to the residual signal in response to the determination that the non-full rank covariance matrix is being used, the echo
suppression attenuating pre-selected frequency bands of the residual signal.

EEE22. Computer program product having instructions which, when executed by a computing device or system, cause said computing device or system to perform the method according to any of EEEs 1-8 or EEE 21.

EEE23. A data-processing system configured to execute the method according to any of EEEs 1-8 or EEE 21.

The invention claimed is:

1. A method for detecting and compensating for inaccurate echo prediction, the method comprising:
receiving a signal at a microphone of an audio system, the signal including audio rendered using a spatial audio renderer across a multi-channel audio output of the audio system;
determining a predicted echo power value based on the received signal;
suppressing echo in the received signal by attenuating pre-selected frequency bands of the received signal based on the predicted echo power value;
receiving a signal from the spatial audio renderer that indicates a change in rendering of audio; and
modifying the echo suppression, by the audio system after the signal from the spatial audio renderer has been received, applied to the received signal in response to receiving the signal from the spatial audio renderer.

2. The method of claim 1, the modifying echo suppression comprising at least one of:

forcing adaptation of an echo suppression module that applies the echo suppression to the received signal; and
increasing an adaptation rate of the echo suppression module.

3. The method of claim 1, the modifying echo suppression comprising scaling the predicted echo power value such that the predicted echo power value is increased.

4. The method of claim 1, wherein the echo suppression applied to the received signal is further based on a detected echo power value, the modifying echo suppression comprising adjusting the predicted echo power value using predetermined filter coefficients.

5. The method of claim 1, the signal from the spatial audio renderer further comprising an identification of a change type associated with the change in rendering of audio, the applying echo suppression taking place over a predetermined time interval associated with the identified change type.

6. The method of claim 1, further comprising applying, by the audio system, echo cancellation to the received signal to generate a residual signal, the echo cancellation comprising subtracting a predicted echo from the received signal, the predicted echo being based on an estimate of an electroacoustic path from speakers of the audio system to the microphone, the echo suppression being applied to the residual signal.

7. The method of claim 6, further comprising determining, by the audio system, that a non-full rank covariance matrix is being used in the echo cancellation and modifying echo suppression, by the audio system, applied to the received signal in response to the determination that the non-full rank covariance matrix is being used.

8. The method of claim 1, further comprising receiving an indication of a system event of the audio system and modifying echo suppression, by the audio system, applied to the received signal in response to receiving the indication of the system event.

9. An audio system comprising:
a spatial audio renderer that renders audio across a multi-channel audio output;
a microphone that captures a signal, the signal including the rendered audio;
an adaptive echo suppressor circuit that suppresses echo in the received signal, the echo suppression attenuating pre-selected frequency bands of the received signal based on a predicted echo power value that is determined based on the captured signal; and
a control circuit coupled to the adaptive echo suppressor circuit and the spatial audio renderer, the control circuit receiving a signal from the spatial audio renderer that indicates a change in rendering of audio, and causing the adaptive echo suppressor circuit to modify echo suppression applied to the received signal in response to receiving the signal from the spatial audio renderer, the echo suppression attenuating pre-selected frequency bands of the received signal.

10. The system of claim 9, the causing the adaptive echo suppressor circuit to modify echo suppression comprising at least one of:
forcing adaptation of the adaptive echo suppressor circuit; and
increasing an adaptation rate of the adaptive echo suppressor circuit.

11. The system of claim 9, the causing the adaptive echo suppressor circuit to modify echo suppression comprising scaling the predicted echo power value such that the predicted echo power value is increased, and attenuating pre-selected frequency bands of the received signal based on the scaled predicted echo power value.

12. The system of claim 9, further comprising an echo cancellation circuit communicatively coupled to the control circuit, the echo cancellation circuit receiving the signal from a microphone and applying echo cancellation to the received signal to generate a residual signal, the echo cancellation comprising subtracting a predicted echo from the received signal, the predicted echo being based on an estimate of an electroacoustic path from speakers of the audio system to the microphone, the echo suppression being applied to the residual signal received from the echo cancellation circuit.

13. The system of claim 9, the signal from the spatial audio renderer further comprising an identification of a change type associated with the change in rendering of audio, the applying echo suppression taking place over a predetermined time interval associated with the identified change type.

14. A method for detecting and compensating for echo cancellation instability, the method comprising:
receiving a signal at a microphone of an audio system, the signal including audio rendered using a spatial audio renderer across a multi-channel audio output of the audio system;
applying, by the audio system, echo cancellation to the received signal to generate a residual signal, the echo cancellation comprising subtracting a predicted echo from the received signal, the predicted echo being based on an estimate of an electroacoustic path from speakers of the audio system to the microphone;
determining a predicted echo power value based on the received signal;
suppressing echo in the residual signal by attenuating pre-selected frequency bands of the residual signal based on the predicted echo power value;
determining, by the audio system, that a non-full rank covariance matrix is being used in determining the predicted echo; and
modifying the echo suppression, by the audio system, applied to the residual signal in response to the determination that the non-full rank covariance matrix is being used.

15. A computer program product having instructions which, when executed by a computing device or system, cause said computing device or system to perform the method according to claim 14.

16. A data-processing system comprising:
one or more processors; and
a non-transitory computer-readable medium storing instructions that, upon execution by the one or more processors, cause the one or more processors to execute the method according to claim 14.

* * * * *